United States Patent
Curtis et al.

[11] 3,713,553
[45] Jan. 30, 1973

[54] FOLDING MULTIPOSITION LOADING RAMP FOR TRUCKS, HAVING TAIL GATES

[76] Inventors: Edgar V. Curtis; Mildred J. Curtis, both of Box 39, Lewistown, Mont. 59457

[22] Filed: Feb. 23, 1971

[21] Appl. No.: 118,105

[52] U.S. Cl. ....................................214/85, 296/61
[51] Int. Cl. .............................................B65g 67/02
[58] Field of Search ............214/85, 85.1; 296/57, 61

[56] References Cited

UNITED STATES PATENTS 3,352,440 11/1967 Wilson ..................................214/85
3,339,968 9/1967 Hall ......................................296/61
1,699,882 1/1929 Ferguson ........................296/61 X

*Primary Examiner*—Albert J. Makay
*Attorney*—Lawrence L. Colbert

[57] ABSTRACT

A truck loading ramp is secured to the vertically swingable truck tail gate by mounting brackets to which one section of the ramp is hinged. The ramp includes a second section hinged to the first ramp section and adapted to be rigidly locked in extended or folded positions. The folded ramp is also lockable to the mounting brackets in either of two carrying positions with the truck tail gate down or up.

4 Claims, 6 Drawing Figures

PATENTED JAN 30 1973 3,713,553

INVENTOR
E. V. CURTIS

BY

ATTORNEY

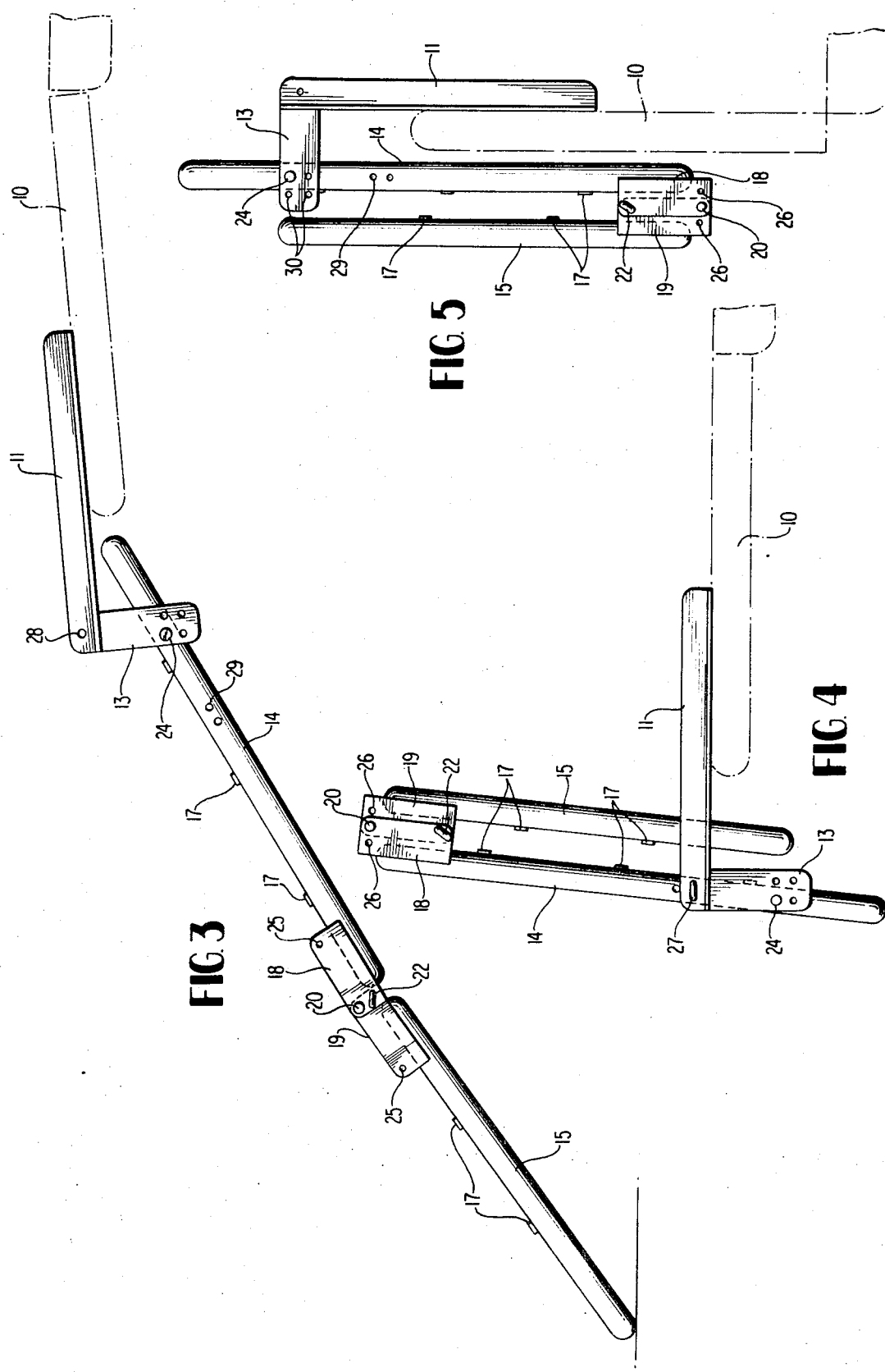

FOLDING MULTIPOSITION LOADING RAMP FOR TRUCKS, HAVING TAIL GATES

Tail gate mounted loading ramps for trucks are known in the prior art and two examples are contained in U.S. Pat. Nos. 3,339,968, Hall, and 3,352,440, Wilson.

The objective of the present invention is to improve upon the prior art devices through the provision of a tail gate attached loading ramp which is more simplified in construction and more versatile and secure in its operation. More particularly, the loading ramp of this invention has a locked extended or unfolded condition with the truck tail gate down where the ramp may be used to load snowmobiles, motorcycles, lawn mowers, and small livestock onto a truck without lifting. The ramp has one folded and locked position with the truck tail gate up and the ramp disposed at its outer side in a very compact carrying position. In another carrying position, the tail gate of the truck is down or level and the locked and folded ramp is substantially perpendicular to the tail gate and extends thereabove to form an end abutment for long loads, or a second "tail gate."

Other features and advantages of the invention will be apparent during the course of the following detailed description.

BRIEF DESCRIPTION OF DRAWING FIGURES

FIG. 3 is an enlarged side elevation of the ramp in its extended use position.

FIG. 4 is a side elevation of the ramp in a first carrying position with the tail gate of the truck down.

FIG. 5 is a similar view of the ramp in a second carrying position with the tail gate up.

DETAILED DESCRIPTION

Figure 1:
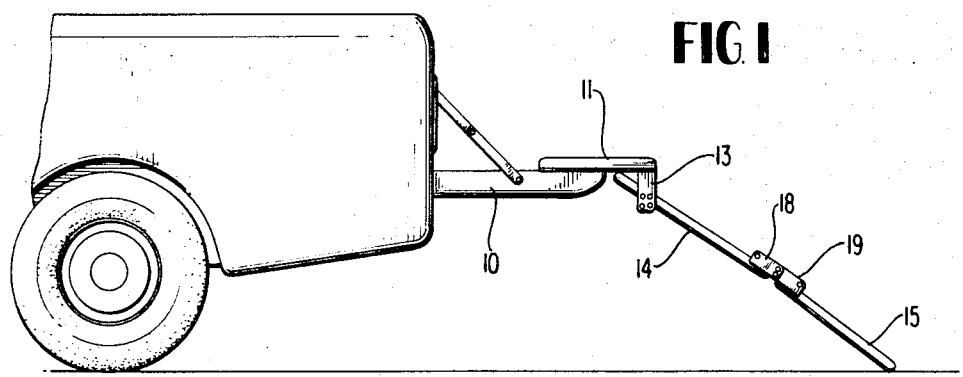
FIG. 1 is a fragmentary side elevation of a pick-up truck or the like having a tail gate equipped with a loading ramp according to the invention.

Referring to the drawings in detail wherein like numerals designate like parts throughout, the numeral 10 designates a vertically swingable hinged end gate or tail gate on the rear end of a pick-up truck or like vehicle. The end gate 10 has a down horizontal position, as shown in FIG. 1, and an up or closed vertical position as in FIG. 5.

The loading ramp embodying the present invention comprises a pair of rigid L-shaped mounting brackets 11 secured with suitable screws 12 to the interior face of the tail gate near its opposite sides. The brackets 11 project beyond the trailing edge of the tail gate and include right angular rigid depending extensions 13, as shown.

Figure 2:
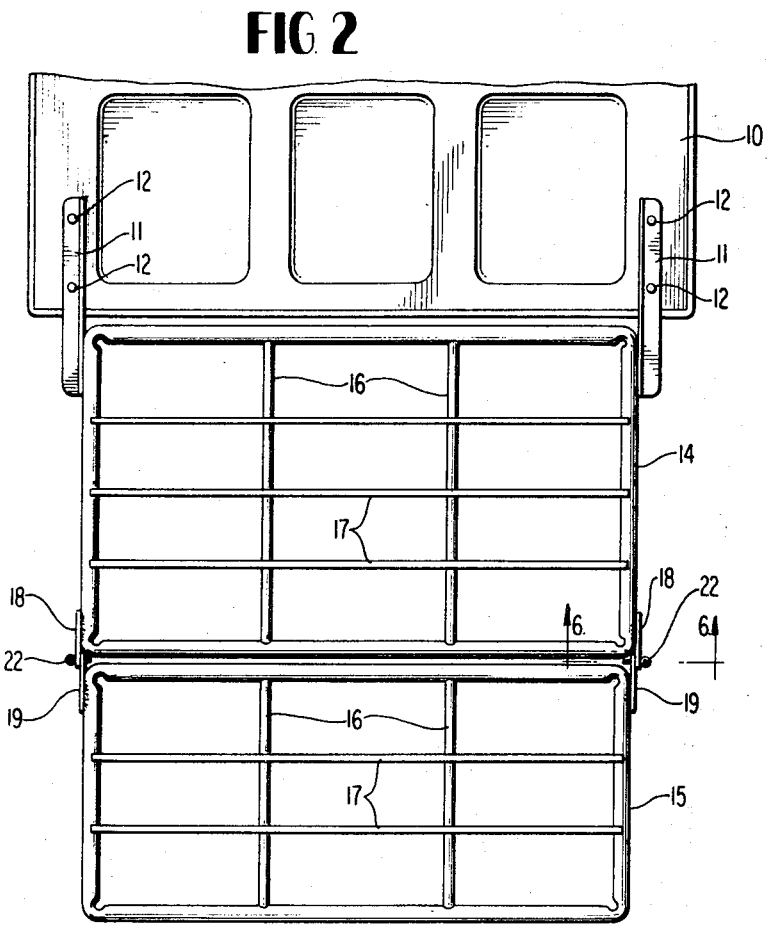
FIG. 2 is a plan view of the device shown in FIG. 1.

The ramp proper comprises first and second ramp sections 14 and 15 each of which is rectangular and includes a sturdy marginal frame and a grid-work of interconnecting bars 16 and 17. The details of construction of the ramp sections may be modified in some cases. The first section 14 is somewhat longer than the second section 15, as clearly shown in FIG. 2.

Figure 6:
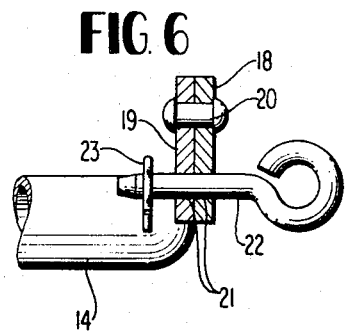
FIG. 6 is an enlarged fragmentary cross section on line 6-6 of FIG. 2.

The two ramp sections 14 and 15 are equipped at their meeting ends and on opposite sides with coacting hinge plates 18 and 19 rigidly secured thereto by welding. The pairs of plates 18 and 19 on opposite sides of the ramp are permanently hingedly connected by suitable pins 20 located near the edges of the plates which are remote from the plane of the ramp, FIGS. 3 and 6. As best shown in FIG. 6, the hinge plates 18 and 19 contain apertures 21 adapted to register when the ramp is unfolded or extended to receive removable locking pins 22 preferably having spring retainer clips 23 thereon. In this manner, the unfolded ramp may be rigidly locked in the use position shown in FIG. 1.

The first ramp section 14 is also permanently hingedly connected near its interior end with the bracket extensions 13 by suitable pivot pins 24 which remain permanently in place like the pivot elements 20. Through these pins 24, the entire ramp structure is bodily pivoted to the mounting brackets 11 for free swinging movement to the various positions shown in the drawings.

The ramp is capable of being folded and locked in either of two carrying positions which are shown in FIGS. 4 and 5. In the first position, FIG. 4, the truck tail gate 10 is down and the folded ramp extends thereabove to form an abutment or a second "tail gate" as where long loads are being hauled on the truck. To assume the position of FIG. 4 after being in the position shown in FIG. 3, the locking pins 22 are removed from their positions in FIG. 3 and the ramp section 15 is folded clockwise around the pivot elements 20 to overlie the ramp section 14 in FIG. 3. Following this, both sections of the folded ramp are turned clockwise on the pivot elements 24 until the carrying position of FIG. 4 is reached. The locking pins 22 are now placed through additional registering apertures 25 in the hinge plates 18 and 19 to lock the ramp sections 14 and 15 in their folded parallel positions, the previously employed apertures receiving the locking pins in FIG. 3 now being visible at 26 in FIG. 4. An additional locking pin 27 is now inserted through an aperture 28 in one bracket 11 which is now in registration with a locking aperture 29 in the adjacent side of ramp section 14, this aperture being shown in FIG. 3.

Similarly, referring to FIG. 5, with the truck tail gate 10 up, and starting with the position of the device in FIG. 3, the two ramp sections 14 and 15 are first folded upon each other in the same manner previously described, after removal of the pins 22, and then the entire folded ramp is turned counterclockwise on the axis of pivot elements 24 and the tail gate 10 is elevated, and the parts will be positioned as shown in FIG. 5. At this time, the locking pins 22 are again placed through the apertures 25 of plates 18 and 19 which are now in registration. This locks the two ramp sections 14 and 15 in their folded vertical positions and the folded ramp will now hang in the position of FIG. 5 by gravity. However, for additional security while the truck is moving, a locking pin or pins may be inserted through positioning openings 30 in the bracket extensions 13, and this will arrest swinging of the folded ramp on the pivot elements 24.

It may now be seen that an extremely simplified and very versatile truck loading ramp is provided with the invention where few parts are employed and the entire structure is secured to the truck tail gate through a single pair of rigid brackets. By virtue of the unique locking pin arrangement described, the ramp may be rigidly locked in the extended use position, FIG. 3, as well as in two carrying positions fully described in connection with FIGS. 4 and 5. The folded ramp in FIG. 4 forms an extra abutment or tail gate for the truck, and in FIG. 5, the ramp is stored in a stable compact condition out of the way of the truck interior. The advantages of the arrangement should now be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A loading ramp for trucks having tail gates which are swingable from up vertical positions to down horizontal positions, said ramp comprising a pair of side mounting brackets adapted for attachment to a truck tail gate in laterally spaced relation, a first ramp section pivoted to said brackets and being freely swingable thereon, a second ramp section pivotally connected to the first ramp section, pairs of hinge plates secured to opposite sides of the first and second ramp sections near their meeting ends, hinge pins pivotally interconnecting said plates, said plates having two separate pairs of locking apertures, one pair of apertures registering when the two ramp sections are extended and the other pair of apertures registering when the two ramp sections are folded, and locking pins engageable selectively through said registering pair of apertures to rigidly lock the first and second ramp sections in extended loading positions and in folded positions where the two sections are approximately parallel.

2. The structure of claim 1, and additional locking means engageable with at least one mounting bracket and said first ramp section to rigidly lock the folded ramp in a carrying position where the ramp cannot pivot on said brackets.

3. The structure of claim 2, and said additional locking means comprising apertures in at least one mounting bracket adapted to register with an aperture in the first ramp section, and a locking pin engageable with said registering apertures.

4. A loading ramp for trucks having tail gates which are swingable from up vertical positions to down horizontal positions, said ramp comprising a pair of side mounting brackets adapted for attachment to a truck tail gate in laterally spaced relation, a first ramp section pivoted to said brackets freely, a second ramp section pivotally connected to said first section, first locking means selectively operable to rigidly lock the first and second ramp sections in an extended position and in a folded position, said first locking means including pairs of hinge plates secured to opposite sides of the first and second ramp sections near their meeting ends, hinge pins pivotally interconnecting said plates, and said plates having two separate pairs of locking apertures, one pair registering to receive locking pins when the two ramp sections are extended and the other pair registering to receive locking pins when the two ramp sections are folded, and an additional locking means engageable with at least one bracket and said first ramp section to rigidly lock the folded ramp in a carrying position on said brackets.

* * * * *